June 18, 1963 G. BERGSTRÄSSER 3,094,637
MANUALLY OPERATED GENERATORS FOR TELEPHONE SERVICE
Filed Jan. 18, 1960
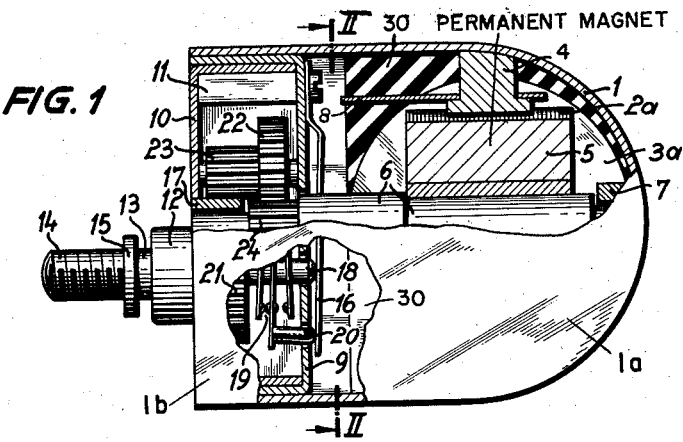
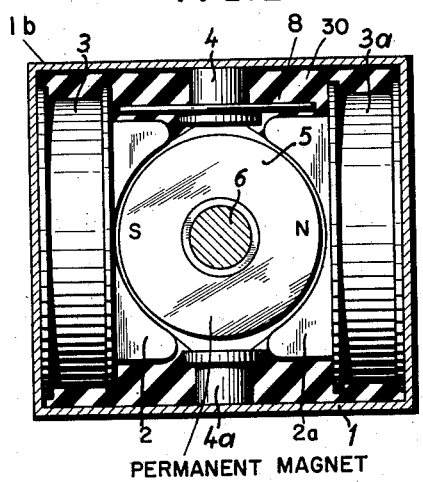
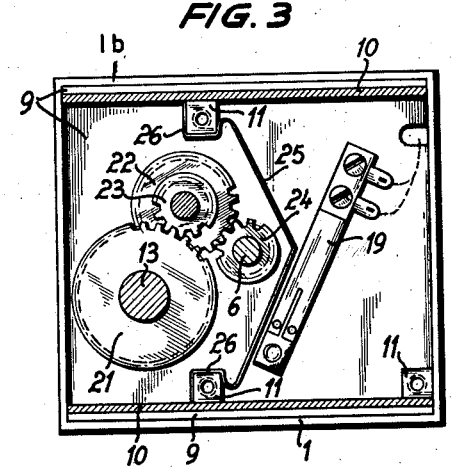
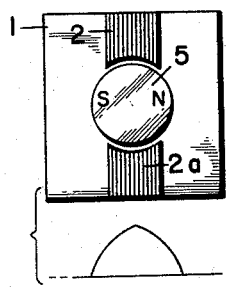 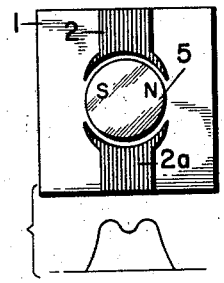 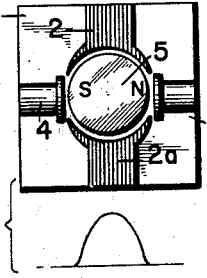 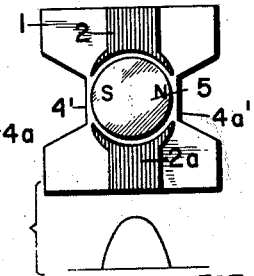
INVENTOR 3,094,637
Patented June 18, 1963

1

3,094,637
MANUALLY OPERATED GENERATORS FOR
TELEPHONE SERVICE
Georg Bergsträsser, Frankfurt am Main, Germany, assignor to Telefonbau und Normalzeit GmbH
Filed Jan. 18, 1960, Ser. No. 2,934
7 Claims. (Cl. 310—69)

This invention refers to manually operated generators for telephone service, often briefly called hand generators. Such generators are furnished at local battery substations. They consist usually of a U-shaped permanent magnet, an armature arranged between the poles thereof, a train of gears for driving the armature and a manually operable crank for operating said train of gears. The subscriber turns the crank by hand when he desires to signal the operator. The signal at the central office is operated by the alternating voltage generated by rotation of the armature. A mechanical switching device is usually included in such type of generators for connecting the armature to the line in response to rotation of the armature. The same switching device may be adapted to disconnect the bell of the subscriber station when the generator is being operated.

It is a general object of this invention to improve manually operated generators for telephone service.

A more recent prior art type of hand generators comprises an armature formed by a permanent magnet arranged between fixed pole pieces supporting windings and a housing of a magnetic material accommodating all the parts of the generator and providing a path for the magnetic flux of its magnetic circuits.

Another object of the invention is to provide improved generators of the aforementioned description which can be more readily assembled than comparable prior art generators and whose assembly involves smaller cost than that of comparable prior art generators.

Another object of this invention is to provide improved generators of the above description wherein the train of driving gears forms a complete sub-assembly unit that can readily be checked as such before being combined with the other parts of the generator, i.e. the electric components thereof.

Another object of the invention is to provide generators of the above description including improved means for controlling the shape of the generated voltage wave and improved means auxiliary switch means.

Still another object of the invention is to provide a generator of the above description having a housing adapted to form auxiliary pole members.

Further objects and advantages of the invention will become apparent as the following description proceeds, and the features of novelty which characterize the invention will be pointed out with particularity in the claims annexed to, and forming part of, this specification.

For a better understanding of the invention reference may be had to the accompanying drawings illustrating the invention wherein—

FIG. 1 is mainly a diagrammatic elevational view of a generator embodying this invention, some parts being shown as being broken away and some parts being shown in cross-section;

FIG. 2 is a section along 2—2 of FIG. 1;

2

FIG. 3 is a side elevation of the structure of FIG. 1 seen in the direction of the arrow R and showing that structure upon removal of plate 10 therefrom; and FIGS. 4 to 7, inclusive, illustrate various configurations of pole pieces and the effect of the change of their configuration upon the geometry of the voltage wave.

Referring now to the drawings, numeral 1 has been applied to indicate a housing of a magnetic material. Housing 1 is substantially pot-shaped, is U-shaped in cross-section and has a substantially semi-cylindrical bottom portion 1a and a substantially rectangular open end portion 1b opposite said bottom portion. The broken-off front surface of housing 1 shown in FIG. 1 is plane and the same applies to its rear surface. Housing 1 provides a path of small reluctance for the magnetic flux of the magnetic circuit of the generator. Housing 1 consists of one single piece of metal drawn to the shape explained above and indicated in the drawings. It is open only at the side of the arrow R where the shaft for the operating crank emerges from the housing. Pole pieces 2, 2a are provided with conventional pole shoes having substantially cylindrical surfaces. Each of the pole pieces 2, 2a supports a cylindrical coil 3, 3a having a slightly smaller diameter than the diameter of the semi-cylindrical bottom portion 1a of housing or frame 1. The generator further comprises auxiliary pole pieces 4, 4a which are provided with pole shoes and which are angularly displaced 90 degrees relative to the pole pieces 2, 2a. Pole pieces 4, 4a form part of the magnetic circuit of the generator. Pole pieces 2, 2a and auxiliary pole pieces 4, 4a are secured to the inside of the frame 1 without resorting to any conventional fastener means such as, for instance, screws, or the like fastener means. Cast body 30, i.e. a body of casting compound cast into housing 1, is adapted to maintain pole pieces 2, 2a and auxiliary pole pieces 4, 4a in position inside of housing or frame 1. Any suitable casting compound may be used for making the pole-piece-supporting cast body 30. This fashion of securing pole pieces to a generator is much less expensive than the conventional use of countersunk screws generally used for that purpose in machinery of this type.

The armature 5 comprises a permanent magnet and is arranged to rotate between pole pieces 2, 2a and auxiliary pole pieces 4, 4a. Armature 5 is supported by a shaft 6 arranged at right angles to the axis of semi-cylindrical bottom portion 1a. The right end of shaft 6 (as seen in FIG. 1) rests in a bearing 7 integral with bottom portion 1a. Numeral 8 has been applied to indicate a plate of insulating material mounted on pole pieces 4 and held in position by means of casting 30. Plate 8 serves the purpose of separating the leads to windings or coils 3, 3a from the armature 5. The end of shaft 6 opposite bearing 7 rests in a bearing 17 forming an integral part of plate 10. Plates 9 and 10 are parallel and arranged in spaced relation and maintained in spaced relation by several spacers 11. Shaft 13 intended to support the manually operable crank (not shown) is arranged parallel to, and laterally spaced from, shaft 6 supporting armature 5. One end of shaft 13 is supported by bearing means 12 forming an integral part of plate 10, whereas the opposite end of shaft 13 is inserted into a circular hole in plate 9 and projects with one end 18 thereof into the space of the right of plate 9, as seen in FIG. 1. The end 14 of shaft 13 opposite end 18 is screw-threaded to permit mounting an opening crank thereon. Shaft 13 is adapted to be shifted in a direction longitudinally thereof from left to right, as seen in FIG. 1, and flange 15 on shaft 13 cooperates with bearing means 12 in forming abutments limiting the aforementioned longitudinal movement of shaft 13. Leaf spring 16 attached to plate 9 engages tip 18 of shaft 13 and normally maintains shaft 13 in the position shown in FIG. 1. Plate 9 supports also leaf-spring-change-over-switch device 19 having an operating projection 20 extending through a perforation in plate 9 and being in engagement with the lower end of leaf spring 16.

The space bounded by plates 9 and 10 is used to accommodate a gear train for driving armature 5. This gear train comprises driving gear 21 mounted on shaft 13, the intermediate pinion 23 meshing with gear 21, the intermediate gear 22 coaxial and jointly rotatable with pinion 23; and pinion 24 meshing with gear 22 and forming an integral part of shaft 6. Plates 9, 10, spacers 11 and parts 13, 21, 23 and 22 form a structural unit or sub-assembly unit. This sub-assembly unit has a secondary function which consists in serving as a lid for closing housing 1. Gear 21 is loosely mounted on shaft 13. Shaft 13 is provided with a pin (not shown) and gear 21 is provided with a cam surface (not shown) adapted to cooperate with said pin. Upon rotation of shaft 13 the aforementioned pin engages the aforementioned cam surface and this results in a shift of shaft 13 from left to right, as seen in FIG. 1. (The above pin-and-cam shaft shifting mechanism has not been shown, its presence being conventional in hand generators.) As a result of shifting shaft 13, spring 16 is moved out of engagement with projection 20, and change-over switch 19 is moved from its left position shown in FIG. 1 to its right position, whereby the generator is connected into the line to the central station.

A partition 25 of sheet metal separates change-over switch 19 from the gear train 21, 23, 22, 24 for operating armature 5. The ends of the metal sheet forming partition 25 are crimped around two of the spacers 11 as clearly shown in FIG. 3.

The auxiliary pole pieces 4, 4a referred to above are a means for achieving a substantially sinusoidal geometry of the voltage wave of the generator. If a generator has pole pieces as shown in FIG. 4 the torque required for rotating the armature thereof is unduly high. Widening of the pole faces of the pole shoes as shown in FIG. 5 results in a reduction of the torque required for operating the generator, but results in a voltage wave having a dip in the region of 90 electrical degrees. This dip illustrated in FIG. 5 is indicative of a large contents of harmonics of a higher order or, in other words, of a high noise level. Hence, operation of the inductor tends to impair communication along adjacent lines. It is possible to reduce the noise level by adding auxiliary pole pieces 4, 4a as shown in FIG. 6, and previously described in connection with FIGS. 1 to 3. As shown in FIG. 6 provision of auxiliary pole pieces 4, 4a yields a substantially sinusoidal voltage wave. The auxiliary pole pieces 4, 4a affect the reluctance of the magnet circuit of the generator causing the reluctance to increase substantially sinusoidally from the center line of the pole shoes associated with pole pieces, 2, 2a toward the neutral zone between pole pieces 2, 2a and auxiliary pole pieces 4, 4a.

In the modification of the structure of FIG. 6 shown in FIG. 7 housing 1 is provided with a pair of re-entrant wall portions 4', 4a' forming a pair of auxiliary pole pieces situated in the space between pole pieces 2, 2a and angularly displaced 90 spatial degrees with respect to pole pieces 2, 2a.

Having disclosed a preferred embodiment of the invention it is desired that the same not be limited to the particular structure disclosed. It will be obvious to any person skilled in the art that many modifications and changes may be made without departing from the broad spirit and scope of the invention. Therefore it is desired that the invention be interpreted as broadly as possible, and that it be limited only as required by the prior state of the art.

I claim as my invention:

1. A manually operated generator for telephone service comprising a substantially hood-shaped casing consisting of one single piece of magnetic sheet material and having a substantially semi-cylindrical bottom portion and a substantially rectangular open-end portion; a pair of pole pieces having pole shoes and arranged inside said housing in substantially coaxial relation to said semi-cylindrical bottom portion thereof; a pair of auxiliary pole pieces having pole shoes and arranged inside said housing and angularly displaced 90 degrees relative to said pair of pole pieces; each of said pair of pole pieces supporting a cylindrical coil having a slightly smaller diameter than the diameter of said semi-cylindrical bottom portion; each of said pair of auxiliary pole pieces being coilless and adapted to control the magnetic reluctance of magnetic circuit of the generator; a casting cast into said housing for maintaining said pair of pole pieces and said pair of auxiliary pole pieces in position; an armature including a permanent magnet arranged in the space bounded by said pole shoes of said pair pole pieces and by said pole shoes of said pair of auxiliary pole pieces; a shaft for supporting said armature; bearing means for one end of said shaft supported by said semi-cylindrical bottom portion of said housing; a pair of rectangular parallel spaced plates integrated to form a structural unit inserted into said housing and closing said open end portion thereof; bearing means on said structural unit for other end of said shaft; and a gear train adapted to drive said shaft arranged in the space between said pair of plates and supported by said pair of plates.

2. A manually operated generator for telephone service comprising in combination:
   (a) a housing of a magnetic material including a pair of flat parallel substantially U-shaped end surfaces and a lateral surface at right angles to said pair of end surfaces, said lateral surface including a closed housing bottom substantially in the shape of a semi-circular cylinder and defining jointly with said pair of end surfaces a substantially rectangular opening juxtaposed to said housing bottom;
   (b) a pair of pole pieces inside said housing arranged in substantially coaxial relation to said housing bottom;
   (c) a pair of energizing coils each supported by one of said pair of pole pieces;
   (d) an armature including a permanent magnet arranged in the space between said pair of pole pieces;
   (e) a shaft supporting said armature and arranged at right angles to the axis of said housing bottom;
   (f) a pair of parallel spaced plates integrated to form a structural unit inserted into and closing said rectangular opening juxtaposed to said housing bottom;
   (g) bearing means on said structural unit for the end of said shaft remote from said housing bottom; and
   (h) a train of driving gears for said shaft arranged in the space between said pair of plates and supported by said pair of plates.

3. A generator as specified in claim 2 comprising a pair of auxiliary pole pieces arranged in the space between said pair of pole pieces and a cast body for maintaining said pair of pole pieces and said pair of auxiliary pole pieces in position inside of said housing.

4. A generator as specified in claim 2 wherein said shaft is supported by both of said pair of plates and wherein said shaft supports a pinion arranged in the space bounded by said pair of plates.

5. A generator as specified in claim 2 comprising a mechanically operated switching means arranged in the space bounded by said pair of plates.

6. A generator as specified in claim 2 comprising
(a) a driving shaft for operating said shaft supporting said armature, said driving shaft being adapted to be moved in a direction longitudinally thereof and to operate said train of driving gears;
(b) a leaf spring arranged inside said housing supported by one of said pair of plates and engaged by one end of said driving shaft;
(c) a mechanically operated switching means arranged in the space between said pair of plates; and
(d) an operator for said switching means projecting across said one of said pair of plates and engaging said leaf spring.

7. A generator as specified in claim 2 wherein said housing is provided with a pair of re-entrant wall portions forming a pair of auxiliary pole pieces angularly displaced 90 degrees relative to said pair of pole pieces.

References Cited in the file of this patent

UNITED STATES PATENTS

| | | |
|---|---|---|
| 2,120,109 | Merrill | June 7, 1938 |
| 2,720,601 | Dean | Oct. 11, 1955 |
| 2,798,995 | McLean | July 9, 1957 |